United States Patent [19]

Smith

[11] 4,054,051

[45] Oct. 18, 1977

[54] THERMOSTATIC CONTROL

[75] Inventor: Charles R. Smith, West Allis, Wis.

[73] Assignee: Cutler-Hammer, Inc., Milwaukee, Wis.

[21] Appl. No.: 696,639

[22] Filed: June 16, 1976

[51] Int. Cl.² .......... G01K 5/28

[52] U.S. Cl. .......... 73/368

[58] Field of Search .......... 73/378.3, 368, 368.2, 73/368.1, 368.7

[56] References Cited

U.S. PATENT DOCUMENTS

| | | | |
|---|---|---|---|
| 2,182,856 | 12/1939 | Riche | 73/378.3 X |
| 2,363,451 | 11/1944 | Stockstrom | 73/368 UX |

*Primary Examiner*—Jerry W. Myracle

*Attorney, Agent, or Firm*—Michael, Best & Friedrich

[57] ABSTRACT

A thermostatic control has a power element, the integral cup shaped portion of which functions as a range lever adjusted by direct contact with a cam member. The cup element amplifies motion as well as transmitting motion. The normally deflecting portion of the diaphragm part of the power element is held stationary. This arrangement eliminates the necessity of a separate lever range and a bias spring and a lever pivot interface and results in energy spring. A molded drive lever provides the following functions: (1) drive switch mechanism lever; (2) a cut-in adjustment; and (3) a cut-out adjustment. The latter two functions are obtained without effect on the trip points of the load-controlling switch.

4 Claims, 6 Drawing Figures

THERMOSTATIC CONTROL

BRIEF SUMMARY OF THE INVENTION

1. Field of the Invention

This invention relates to improvement in motion transmission mechanism particularly for such mechanism incorporated in thermostatic control switches. An object of the invention is to provide a low cost and a highly reliable and accurate thermostat.

2. Description of the Prior Art

Thermostats of this type are described in U.S. Pat. Nos. 2,314,191; 2,314,240; 3,135,849; and 3,241,381. The thermostats described in such patents include a thermal responsive power element operating in response to changes in vapor pressure brought about by changes in temperature. The mechanisms of these patents require a multiplicity of separately acting levers and springs to drive the operating lever of the snap action mechanism in opposite directions. None of these or any other patents now known to applicant teach that the operating lever is a fundamental part of the power element and also determines the range adjustment. Furthermore, in these and other patents known to the applicant the cup of the power element is stationary whereas in this invention the flexible member or the displacement diaphragm is held stationary and the cup is movable.

DETAILED DESCRIPTION OF THE PREFERRED EMBODIMENT

The basic components of the thermostatic control embodying the present invention are described in detail in Kuhn et al U.S. Pat. No. 3,241,381. Only those components which vary in their structural details from those so described will be described herein. A molded base 10 provides the mounting for the various components of this thermostat. A thermo-responsive power element 12 has an integral cupshaped portion 14 which forms a wall of the diaphragm chamber of the power element. This cup-shaped portion 14 functions as both a motion amplifier and as a range lever, thus eliminating some of the levers found in the prior art.

Figure 1:
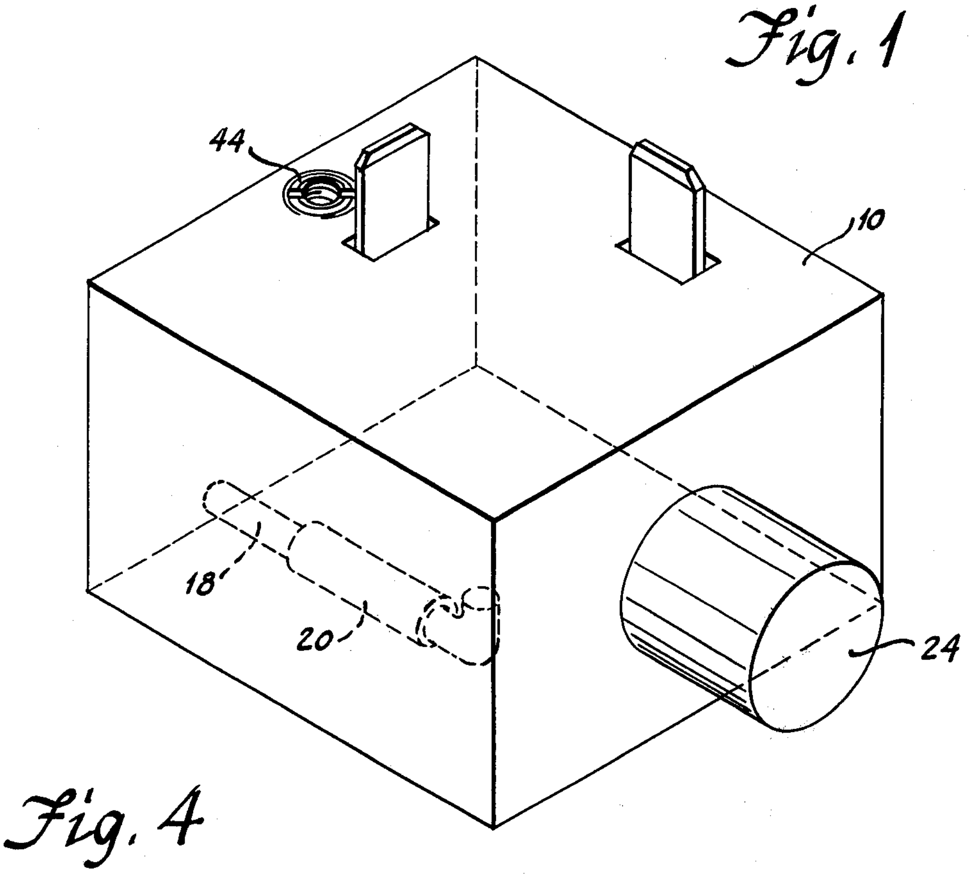
FIG. 1 is a perspective view of a thermostatic control switch constructed in accordance with the present invention.
Figure 4:
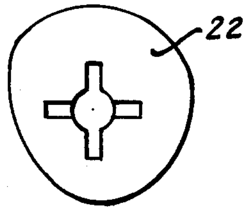
FIG. 4 is a view in side elevation of the range adjusting cam.
Figure 6:
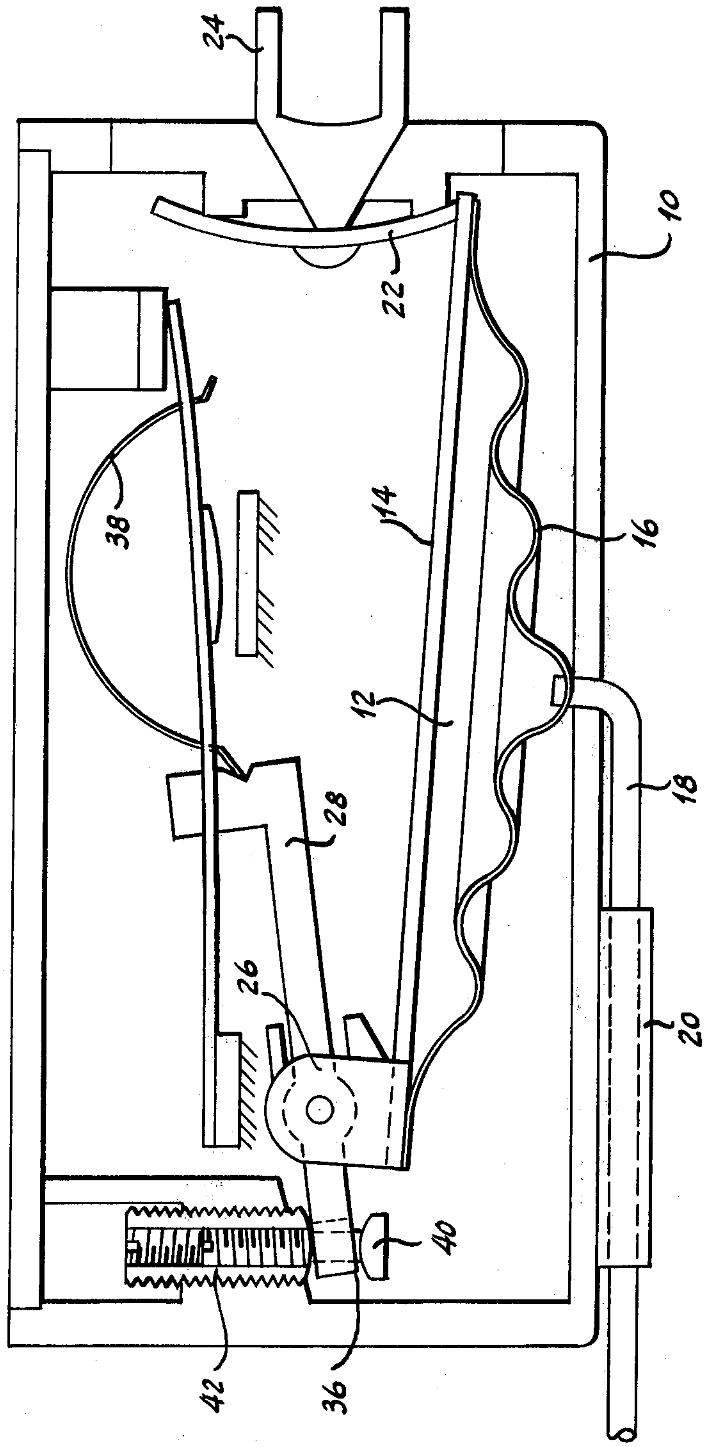
FIG. 6 is a schematic view of the thermostatic control switch shown in FIG. 1, 2 and 3 showing the relationship of the components of the switch.

A flexible diaphragm 16 is suitably secured in sealed relation to the cup-shaped portion 14 to form an enclosed diaphragm chamber. A capilliary tube 18 is mounted in a tube guide 20, which tube guide can be either on the bottom of the molded base 10 or within the base 10. The inner end of the capilliary tube 18 is sealed to an opening in the central portion of the diaphragm 16. The tube 18 is secured to the molded base and forms the support for the diaphragm 16 and for the entire power element 12. The thermo-responsive power element 12 and the capilliary tube 18 are charged in the customary manner with a vapor pressure forming gas such as Freon F-22 or F-12 or methyl chloride all in accordance with the teachings of Kuhn et at U.S. Pat. No. 3,241,381 and Smith U.S. Pat. No. 2,751,935. The cup-shaped portion 14 is fulcrumed on the interface between an adjustable cam 22 (see FIGS. 4 and 6). The cam 22 is movably adjusted by a knob 24 to determine the range within which "cut-in" and "cut-out" takes place.

Figure 5:
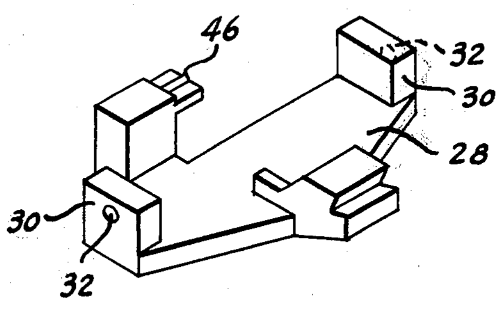
FIG. 5 is a perspective view of the drive lever.

In performing its function as a range lever the portion 14 is provided with spaced upstanding ears 26 to which is pivoted a molded combination lever 28 (see FIG. 5). The combination lever 28 has spaced integral upstanding flanges 30 which are provided with apertures into which pivot studs 32 on the ears 26 seat to form a pivotal connection between the portion 14 and the combination lever 28. As the portion 14 is moved upwardly due to the downward portion of the diaphragm 16 against its relatively fixed center portion as held by the capillary tube 18, the combination lever 28 will swing upwardly about a lost motion adjustment 36 which is factory set and calibrated to balance the point at which the expansion and contraction of the power element will cause a flapper spring 38 to move over dead center to snap closed or snap open the contacts of the switch as taught by the prior art made of record herein.

Figure 3:
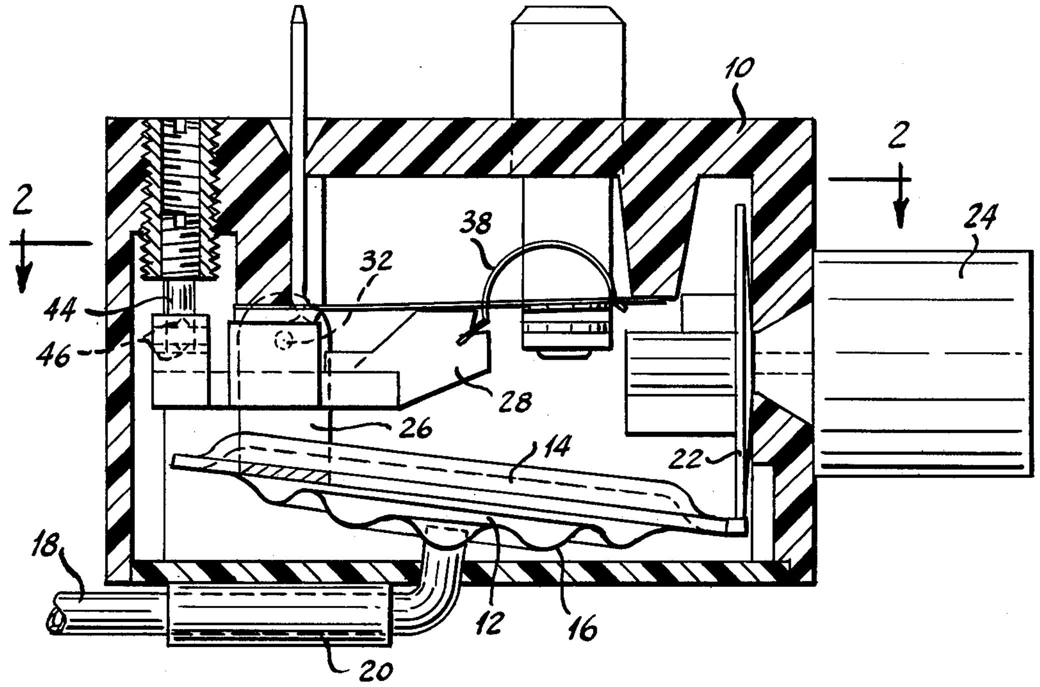
FIG. 3 is a sectional view taken on the line 3—3 of FIG. 2.
Figure 2:
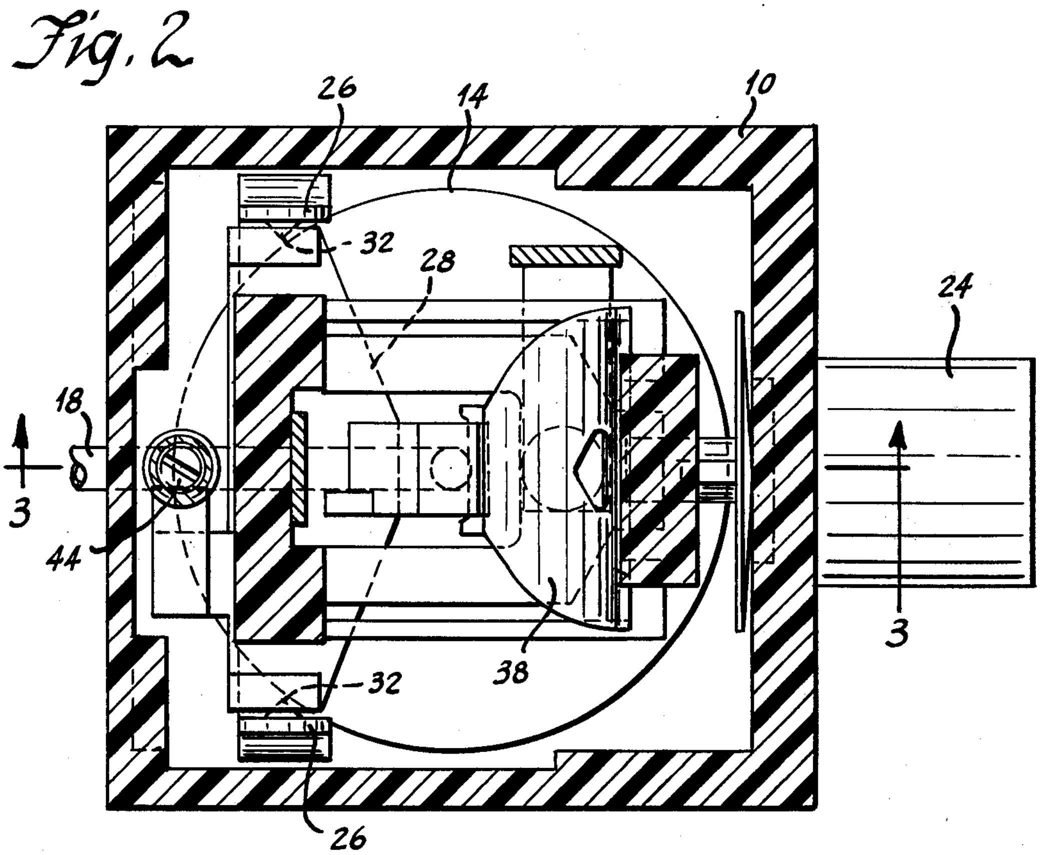
FIG. 2 is a sectional view taken on the line 2—2 of FIG. 3.

The calibration of the lost motion adjustment 36 can be made by a cut-in screw 40 and a cut-out screw 42 or by a single screw 44 (see FIG. 3) having spaced parallels and opposed surfaces which have an interface connection with knife-like pivots 46 on the combination lever 28 (see FIGS. 3 and 5).

The arrangement just described eliminates the necessity of a separate range lever and energy spring and a biased spring and lever pivot interface. This elimination results in energy saving as well as making a more reliable and accurate operating unit. The molded combination lever 28 provides the following functions:

1. to drive the switch mechanism;
2. a cut-in adjustment; and
3. a cut-out adjustment.

Also this arrangement because of fewer parts lowers the manufacturing cost of the thermostat and makes it more reliable and accurate than those of the prior art.

I claim:

1. A control for a thermostat having a thermal responsive power element consisting of a rigid cup-shaped portion having mounted thereon a single flexible diaphragm, such power element characterized in that there is a capillary tube which is rigidly secured to the diaphragm to fixedly mount the diaphragm and provide for movement of said cup-shaped portion in linear lines relative to changes in pressure of the gas in the chamber provided by such member and such diaphragm.

2. A control as defined in claim 1 in which there is a range adjustment accomplished by a cam acting directly on the cup-shaped portion of the power element.

3. A control as defined in claim 2 in which there is a lost motion calibrated differential between a molded drive lever and a permanent adjustment to determine the open and close position for a range cam adjustment mounting means.

4. A control is defined in claim 3 in which the mounting means for the mechanical elements is incorporated as an integral part of a molded base.

* * * * *